Dec. 12, 1961     A. R. TINDELL     3,012,306
METHOD OF SECURING THE COVER ON A THERMOCOUPLE CABLE
Filed July 27, 1959
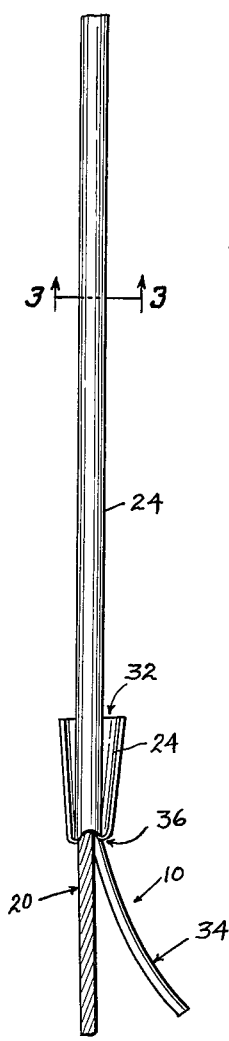
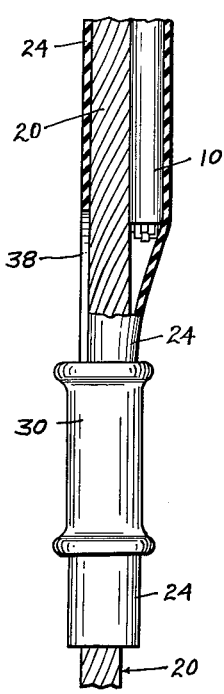
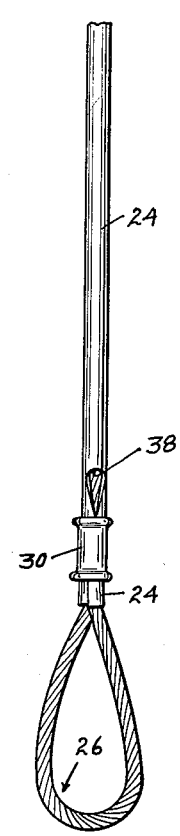
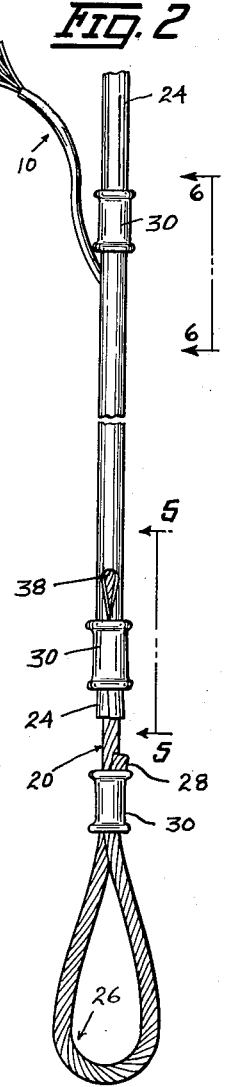
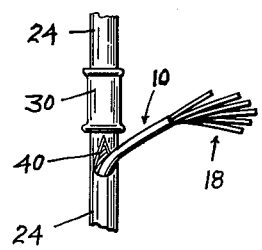
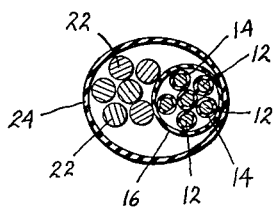
INVENTOR.
ALVIN R. TINDELL
BY Morton S. Adler
ATTORNEY.

United States Patent Office 3,012,306
Patented Dec. 12, 1961

3,012,306
METHOD OF SECURING THE COVER ON A THERMOCOUPLE CABLE
Alvin R. Tindell, Des Moines, Iowa, assignor to Hot Spot Detector, Inc., a corporation of Iowa
Filed July 27, 1959, Ser. No. 829,853
4 Claims. (Cl. 29—155.5)

This invention relates to improvements in thermocouple cables of the type constructed to register temperatures at predetermined intervals longitudinally of the cable. More particularly the cable to which this invention applies includes a multiple strand thermocouple cable of well known construction wherein each strand is enclosed in a separate insulated covering with all of said strands intertwined and encased in a common wrapping or cover. Such cable is designed to be placed in grain bins or the like either when empty or filled and to provide rigidity for the thermocouple cable it is encased in parallel relationship to a strong but flexible steel strand supporting cable by an outer covering which is preferably of transparent plastic material.

In the use of such cables it has been observed that the end of the steel cable to be inserted into the bin is formed into a secured loop and the outer covering encasing both cables and the thermocouple cable are severed at a point spaced from the loop. With the thermocouples at known positions, temperatures at known depths can be recorded for the contents of the bin. Experience has demonstrated, however, that temperature readings from specified thermocouples have not always reflected the temperature at the bin location contemplated according to the depth to which the cable was inserted and the known spacing of the thermocouples. Such errors have developed by the fact that in inserting the combined thermocouple cable and steel cable unit into a filled grain bin, or in probing therein, the weight and bulk of the grain presents such as enormous resistance force that the outer cable covering is frequently crimped or compressed longitudinally from its severed end into a position comparable to the compressed position of the bellows on an accordion. This in turn distorts the thermocouple cable so that the spacing of the thermocouples is altered sufficiently to interfere with the registering of temperatures at bin locations calculated upon the original fixed position of the cable. In addition it has been found that probing in a grain bin with a cable as described can result in the insulation at the severed end of the strands in thermocouple cable becoming worn away sufficiently to cause a short circuit of such cable.

With the above observations in mind, it is one of the important objects of this invention to provide a means and method of securing the outer covering and thermocouple cable, in a cable construction of the type set out above, from slipping or sliding relative to each other or relative to the supporting cable.

Another object contemplated herein is the provision in a cable construction as set forth of a means and method for protecting the cable ends of the thermocouple cable against abrasive contact with grain or the like so as to prevent any shorting in the electrical circuit.

Further objects and the more obvious advantages of this invention will be mentioned or else appear plainly from the description which follows.

This invention consists of novel methods and combination of parts to be hereinafter described whereby the objects set forth are attained, as pointed out in the claims, and illustrated in the accompanying drawings, in which:

FIG. 1 is an elevational view illustrating the first step in preparing the outer cable covering for attachment to the steel cable, FIG. 2 is an elevational view illustrating the outer cable cover secured to the steel cable at both the upper and lower ends thereof and also illustrating the steel cable loop separately secured relative to the outer covering, FIG. 3 is a cross sectional view taken on the line 3—3 of FIG. 1 for purposes of showing the type of cable with which this invention is concerned, FIG. 4 is an elevational view illustrating the steel cable loop and outer covering secured by a common securing means, FIG. 5 is an enlarged longitudinal sectional view taken from the line 5—5 of FIG. 2, and FIG. 6 is a fragmentary elevational view taken from the line 6—6 in FIG. 2.

Referring to the drawings no invention is claimed in the general cable construction shown in FIG. 3 and the same is illustrated to more clearly point out the type of cable to which this invention is applied. For purposes of this disclosure the thermocouple cable designated generally by the numeral 10 will be understood to comprise a plurality of strands 12 individually encased in respective insulated covers 14 which are all encased in the insulated covering 16. It will also be understood that cable 10 is of well known construction for its intended purpose having thermocouple connections at predetermined intervals and with the upper cable end 18 (FIG. 2) designed to extend to and connect with certain recording or registering instruments that are not material here and thus are not shown. The steel cable indicated generally by the numeral 20 is composed of a plurality of strands 22 twisted together in a well known fashion. It is relatively strong but flexible in structure and is utilized for providing rigidity and support to cable 10 for insertion, withdrawal and probing relative to a grain bin or the like. Cables 10 and 20 are in adjoining parallel relationship and are encased by the covering 24. Such cable construction referred to is more particularly described in Patent No. 2,665,322.

As pointed out above it is the practice to form the lower end of cable 20, which will be inserted into the bin, with a loop 26 in which the free end 28 is secured to the main cable length by any suitable means such as the collar or sleeve 30 which can be crimped or otherwise tightened to hold the clamped portions against separation. Such a loop serves as a means to which a depending weight can be attached under some circumstances not here material, and may also serve as a probing head. Because of the tightness with which member 30 of the type in general use, must be secured, it is desirable and the common practice to sever cable 10 above member 30 so as to eliminate the possibility of cutting insulation covers 14 and causing a short in strands 12 if member 30 is clamped on cover 24 with cable 10 inside. Thus from a practical standpoint since cable 10 is inside of cover 24, the practice is to sever both just short of the member 30. Consequently, the use of this cable as thus far described has resulted in the disadvantage at the severed end of cover 24 and cable 10 as above pointed out and such disadvantage and resulting inaccuracy at times in correlating temperature readings with calculated bin locations has persisted even though such cables have been in wide use over a long period of time.

In order to overcome the problem of the slippage of cover 24 and distortion of cable 10 as disclosed I have materially improved the efficiency of this thermocouple cable construction by securing the severed ends of the cover 24 and thermocouple cable 10 to the supporting cable 20 and by having added this feature to the cable construction the disadvantages previously outlined have been overcome. Having thus disclosed how the problems set forth may be satisfactorily solved, it will be apparent that various means can be devised to accomplish the same and one satisfactory means of doing so is illustrated in the accompanying drawings wherein I have slit cover 24 from its lowered severed end above member 30 longitudinally along the axis of the steel cable 20 and preferably on a line diametrically opposite to cable 10. The slit portion of such cover is then peeled back as at 32 in FIG. 1 to expose a length 34 of cable 10 corresponding to the length of the slit. Cable 10 can then be severed at the inner extremity of the slit 36 whereby the slit portion of cover 24 can be returned to its original position and secured either separately to cable 20 by a collar 30 as shown in FIG. 5 or secured by such a collar used also for securing loop 26 as shown in FIG. 4. By this method, the strand ends of cable 10 are adequately covered and protected by cover 24 (FIG. 5) and at the same time, cover 24 is tightly secured to cable 20.

When returning the slit portion of cover 24 to its original position, a small separation or opening 38 may remain and it is thus preferable, though not necessarily required, that the original slitting of cover 24 be at a suitable point away from cable 10 so that the severed end of cable 10 will ultimately be protected as much as possible and not be susceptible to the possibility of abrasive contact from grain that might work its way into the separation 38 if it were directly or closely positioned relative to such severed strand ends.

At the upper end of cables 10 and 20, cover 24 may be similarly slit or provided with an opening 40, preferably in juxtaposition to cable 10, through which cable 10 can be passed as shown in FIGS. 2 and 6 for extension to and connection with the recording or registering instrument as may be employed. In this way, cover 24 may be effectively anchored to cable 20 at both ends.

It will be appreciated that the above disclosed means of securing the severed ends of cover 24 and cable 10 to cable 20 are only illustrative and that any other suitable wrappings, clamps or adhesives susceptible of accomplishing the objectives set forth are within the contemplation and scope of this invention.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. In a thermocouple cable construction including a thermocouple cable held in adjoining parallel relationship to a flexible supporting cable by a common cover, and wherein said cover and thermocouple cable terminates at one end short of the corresponding end of said supporting cable, a method of securing said cover against slippage relative to said supporting cable and in a covering position relative to the corresponding end of said thermocouple cable, said method comprising the steps of making a longitudinal slit in said cover from the end thereof, peeling said slit portion back to expose said thermocouple cable, severing said thermocouple cable so that the severed end thereof will be disposed intermediate the extremities of said slit, returning said slit portion to its original position, and securing said cover intermediate its outer end and the severed end of said thermocouple cable to said supporting cable.

2. In a thermocouple cable construction including a thermocouple cable held in adjoining parallel relationship to a flexible supporting cable by a common cover, and wherein said cover and thermocouple cable terminates at one end short of the corresponding end of said supporting cable, a method of securing said cover against slippage relative to said supporting cable and in a covering position relative to the corresponding end of said thermocouple cable, said method comprising the steps of making a longitudinal slit in said cover from the end thereof in juxtaposition to said supporting cable, peeling said slit portion back to expose said thermocouple cable, severing said thermocouple cable so that the severed end thereof will be disposed intermediate the extremities of said slit, returning said slitted cover to its original position, and securing said cover intermediate its outer end and the severed end of said thermocouple cable to said supporting cable.

3. In a thermocouple cable construction including a thermocouple cable held in adjoining parallel relationship to a flexible supporting cable by a common cover and wherein said cover and thermocouple cable terminates at one end short of the corresponding end of said supporting cable, a method of securing said cover against slippage relative to said supporting cable and in a covering position relative to the corresponding end of said thermocouple cable, said method comprising the steps of making a longitudinal slit in said cover from the end thereof, peeling said slit portion back to expose said thermocouple cable, severing said thermocouple cable so that the severed end thereof will terminate short of the corresponding end of said cover, returning said slitted cover to its original position, and securing said cover intermediate its outer end and the severed end of said thermocouple cable to said supporting cable.

4. In a thermocouple cable construction including an insulated thermocouple cable held in adjoining parallel relationship to a flexible supporting cable by a common cover and wherein said cover and thermocouple cable terminates at one end short of the corresponding end of said supporting cable, a method of securing said cover against slippage relative to said supporting cable and in a covering position relative to the corresponding end of said thermocouple cable, said method comprising the steps of making a longitudinal slit in said cover from the end thereof, peeling said slit portion back to expose said thermocouple cable, severing said thermocouple cable so that the insulated severed end thereof will terminate short of the corresponding end of said cover, returning said slitted cover to its original position so as to encase said severed end, and securing said cover intermediate its outer end and the severed end of said thermocouple cable to said supporting cable.

References Cited in the file of this patent
UNITED STATES PATENTS

| | | |
|---|---|---|
| 1,504,630 | Lilleburg | Aug. 12, 1924 |
| 1,574,297 | Lilleburg | Feb. 23, 1926 |
| 2,788,513 | Howes | Apr. 9, 1957 |
| 2,796,455 | Jones | June 18, 1957 |
| 2,864,878 | Dalglish | Dec. 16, 1958 |

FOREIGN PATENTS

| | | |
|---|---|---|
| 579,100 | Great Britain | July 23, 1946 |
| 676,407 | Great Britain | July 23, 1952 |